(12) United States Patent
Bouvet et al.

(10) Patent No.: US 10,772,065 B2
(45) Date of Patent: Sep. 8, 2020

(54) METHOD AND DEVICE FOR SUPPLYING LOCATION INFORMATION TO AN APPARATUS CONNECTED TO A NETWORK ACCESS POINT

(71) Applicant: Orange, Paris (FR)

(72) Inventors: Bertrand Bouvet, Perros Guirec (FR); Stephane Boizard, Fronton (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/063,443

(22) PCT Filed: Nov. 24, 2016

(86) PCT No.: PCT/FR2016/053076
§ 371 (c)(1),
(2) Date: Jun. 18, 2018

(87) PCT Pub. No.: WO2017/103367
PCT Pub. Date: Jun. 22, 2017

(65) Prior Publication Data
US 2019/0174451 A1   Jun. 6, 2019

(30) Foreign Application Priority Data
Dec. 17, 2015   (FR) ...................................... 15 62650

(51) Int. Cl.
*H04W 64/00* (2009.01)
*H04W 48/00* (2009.01)
(Continued)

(52) U.S. Cl.
CPC ....... *H04W 64/003* (2013.01); *H04L 61/2015* (2013.01); *H04L 61/2053* (2013.01);
(Continued)

(58) Field of Classification Search
None
See application file for complete search history.

(56) References Cited

U.S. PATENT DOCUMENTS 8,229,888 B1 * 7/2012 Roskind ........... H04N 21/25808
707/621
8,718,596 B1 * 5/2014 Xue ...................... H04W 64/00
455/404.2

(Continued)

FOREIGN PATENT DOCUMENTS

| FR | 2887723 A1 | 12/2006 |
| WO | 2007015068 A1 | 2/2007 |
| WO | 2008065294 A1 | 6/2008 |

OTHER PUBLICATIONS

English translation of the Written Opinion of the International Searching Authority dated Feb. 17, 2017 for corresponding International Application No. PCT/FR2016/053076, filed Nov. 24, 2016.
(Continued)

*Primary Examiner* — Eunsook Choi
(74) *Attorney, Agent, or Firm* — David D. Brush; Westman, Champlin & Koehler, P.A.

(57) ABSTRACT

A method and a device for supplying location information to an apparatus connected to a network access point. The a method is implemented by a network access point, which is capable of providing the apparatus with access to a communication network to which the access point is connected when the apparatus is connected to a local network of the network access point. The network access point obtains, from a server of the communication network, information on the location of the network access point, the location information being location information certified by the operator of the communication network. The network access point
(Continued)

receives, from the apparatus, a request for location information and sends the certified location information obtained to the apparatus.

12 Claims, 1 Drawing Sheet

(51) Int. Cl.
*H04W 88/08* (2009.01)
*H04L 29/12* (2006.01)
*H04L 29/06* (2006.01)
*H04W 84/12* (2009.01)

(52) U.S. Cl.
CPC ......... *H04L 63/0876* (2013.01); *H04W 48/17* (2013.01); *H04W 88/08* (2013.01); *H04W 84/12* (2013.01)

(56) References Cited

U.S. PATENT DOCUMENTS

| | | | |
|---|---|---|---|
| 2005/0148342 A1 | 7/2005 | Sylvain | |
| 2007/0025337 A1* | 2/2007 | Polk | H04L 29/12113 370/352 |
| 2007/0082677 A1* | 4/2007 | Donald Hart | H04W 16/18 455/456.1 |
| 2008/0279116 A1 | 11/2008 | Tuffin et al. | |
| 2009/0003330 A1* | 1/2009 | Li | H04L 29/12783 370/389 |
| 2009/0005066 A1* | 1/2009 | Florkey | H04L 61/2015 455/456.1 |
| 2009/0034536 A1 | 2/2009 | Morand et al. | |
| 2013/0155965 A1* | 6/2013 | Koodli | H04W 64/003 370/329 |
| 2014/0010150 A1* | 1/2014 | Agarwal | H04L 67/18 370/328 |
| 2014/0185536 A1* | 7/2014 | Lynn, Jr. | H04L 12/4633 370/329 |
| 2014/0254471 A1* | 9/2014 | Fang | H04W 84/047 370/315 |
| 2015/0117458 A1* | 4/2015 | Gurkan | H04L 45/72 370/392 |
| 2015/0189557 A1* | 7/2015 | Touati | H04W 36/0066 370/332 |

OTHER PUBLICATIONS

International Search Report dated Feb. 17, 2017 for corresponding International Application No. PCT/FR2016/053076, filed Nov. 24, 2016.

Written Opinion of the International Searching Authority dated Feb. 17, 2017 for corresponding International Application No. PCT/FR2016/053076, filed Nov. 24, 2016.

* cited by examiner

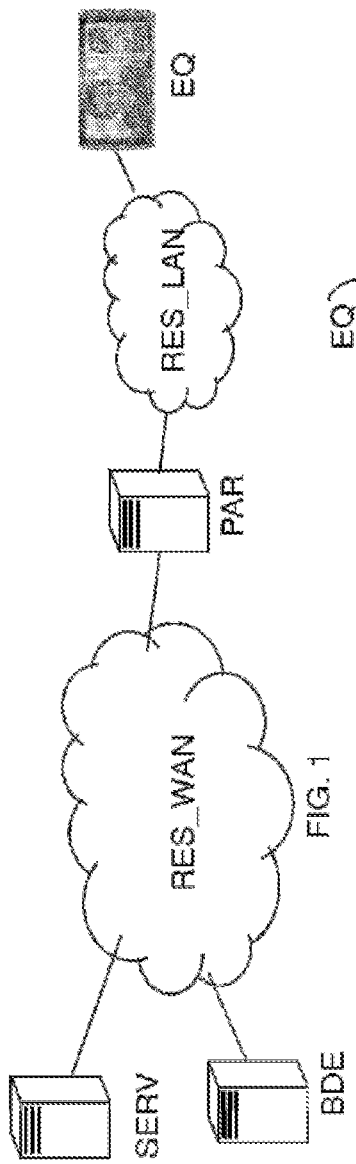
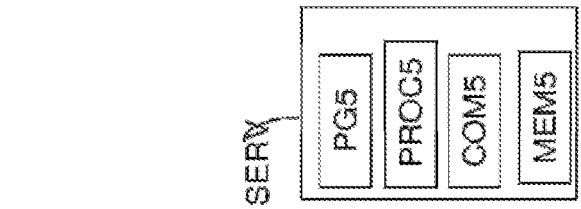
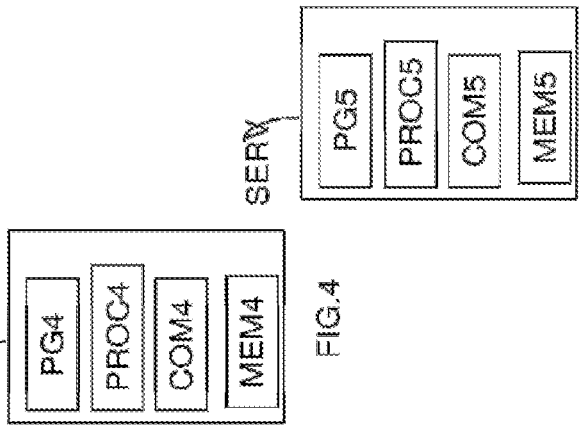
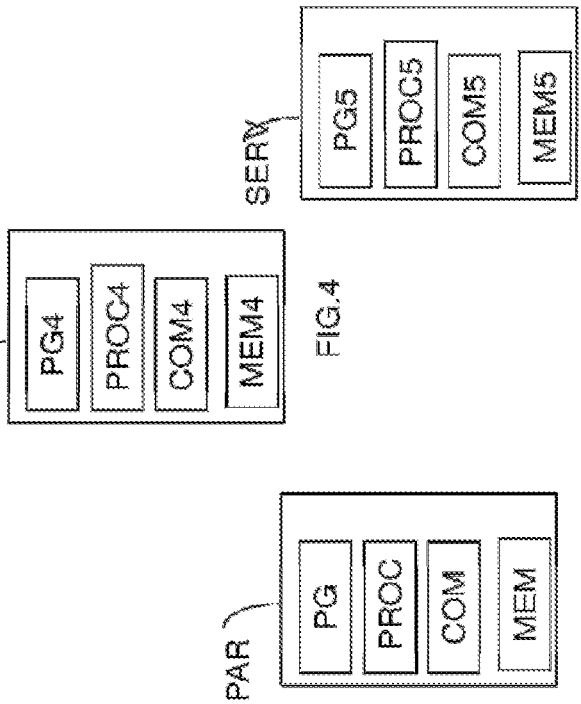
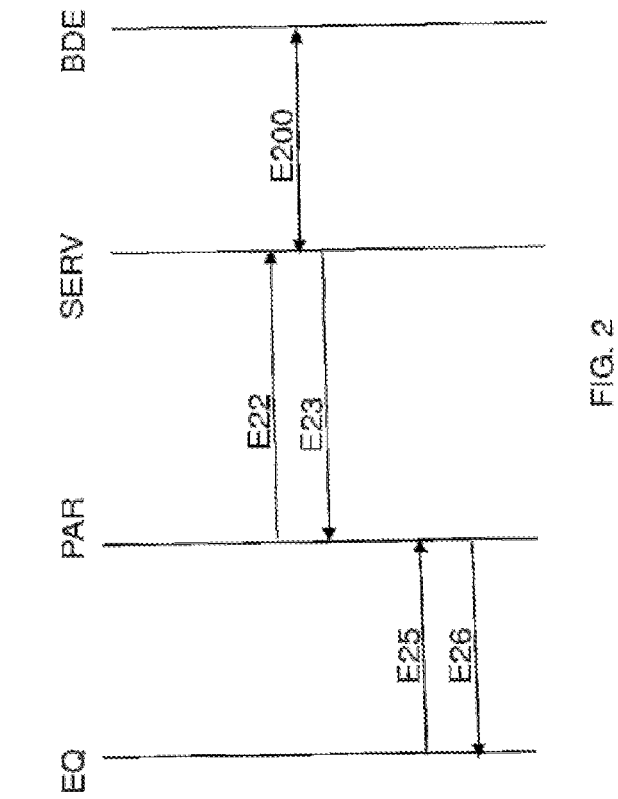

METHOD AND DEVICE FOR SUPPLYING LOCATION INFORMATION TO AN APPARATUS CONNECTED TO A NETWORK ACCESS POINT

CROSS-REFERENCE TO RELATED APPLICATIONS

This Application is a Section 371 National Stage Application of International Application No. PCT/FR2016/053076, filed Nov. 24, 2016, the content of which is incorporated herein by reference in its entirety, and published as WO 2017/103367 on Jun. 22, 2017, not in English.

FIELD OF THE DISCLOSURE

The invention relates to a method for supplying location information to an object connected to a local area network of a point of access to a communication network.

BACKGROUND OF THE DISCLOSURE

Services supplied to users via mobile terminals or connected objects increasingly require knowing the location of said terminals or said objects in order to render a service suited to a user, and in particular a geolocated service.

Hereinbelow, the term equipment item will be used to designate, independently, a terminal, mobile or otherwise, or any object capable of connecting to a communication network to render a service using said communication network, such an object is called a connected object.

Location services for supplying location information to an equipment item are known from the prior art. For example, an equipment item which has a GPS (Global Positioning System) functionality can obtain its location by activating this functionality. However, this solution requires the equipment item to be equipped with a GPS module and the activation of the location by such a GPS system requires significant resources of the equipment item. Furthermore, the GPS system does not always function when the equipment item is situated inside a building.

It is also known practice to locate a mobile terminal when this mobile terminal is connected to a 2G/3G/4G mobile communication network. In this case, the position of the mobile terminal can be determined from an identifier of a radio cell to which the mobile terminal is attached to access the mobile communication network. However, this solution is possible only if a mobile communication network is available in proximity to the mobile terminal and if the mobile terminal has a communication module suitable for attaching to such a network. Now, connected objects do not generally have such a communication module in order not to increase the cost of manufacturing these objects.

Another solution for determining the location of an equipment item is to use the location of a WIFI access point when this equipment item accesses the communication network via a WIFI access network. However, that requires knowing beforehand the position of the WIFI access point, which is not always the case when the WIFI access point via which the equipment item connects to the communication network is not a WIFI access point managed by the operator of the equipment item. Furthermore, the location obtained for the equipment item is not very accurate and it is not certified by the communication network. Such a location is therefore not reliable and in particular it cannot be used to locate the equipment item in the case of an emergency call sent via the equipment item by a voice over WIFI network (also called VoWIFI) service.

There is therefore a need to improve the state of the art.

SUMMARY

The invention relates to a method for supplying location information to an equipment item connected to a local area network of a network access point adapted to give said equipment item access to a communication network to which the access point is connected. The supply method, implemented by said network access point, comprises the following steps:

obtaining, from a server of the communication network, information on the location of said network access point, said location information being location information certified by the operator of the communication network, receiving, from said equipment item, a request for location information, sending, to said equipment item, said certified location information obtained.

The method according to the invention makes it possible to supply an equipment item connected to a local area network of an access point with location information certified by the operator of the communication network. Thus, such location information is reliable and can be used in particular when making emergency calls. The network access point can be a home gateway adapted to establish a local area network, for example a WIFI network, to which equipment items of a user can connect. The network access point can also be a public WIFI HotSpot of an operator of the communication network. According to yet another variant, the network access point can be a mobile terminal adapted to operate as modem/router.

The different embodiments or features mentioned hereinbelow can be added independently or in combination with one another to the steps of the supply method defined hereinabove.

According to a particular embodiment, the location information is a standardized geographic code. This particular embodiment of the invention makes it possible to supply said equipment item with accurate location information. In addition, such a standardized code can thus be understood simply by a service provider offering a geolocated service via said equipment item.

According to another particular embodiment of the invention, the obtaining of said location information is implemented in a phase of attachment of said network access point to the communication network. This particular embodiment of the invention makes it possible to obtain the certified location information of the network access point as soon as the network access point connects to the communication network. According to another particular embodiment of the invention, the certified location information is obtained from an OFFER message according to the DHCP protocol sent in response to a DISCOVER message sent by said network access point to a DHCP server of the communication network. This particular embodiment of the invention makes it possible to transmit the location information according to a standardized message that can be understood by all the network access points.

According to another particular embodiment of the invention, the obtaining of said location information is implemented in a phase of configuration of said network access point, after the attachment of the network access point to the communication network. In this particular embodiment of the invention, the location information is obtained by the network access point at the same time as the configuration parameters of the network access point, limiting the number of messages exchanged to obtain this information.

According to another particular embodiment of the invention, the certified location information is obtained from a response to a request sent by the network access point according to the http protocol. This particular embodiment of the invention makes it possible to transmit the location information according to a standardized message that can be understood by all the network access points.

According to another particular embodiment of the invention, the supply method comprises, beforehand, a step of sending a location request to a server of the communication network comprising an IP (Internet Protocol) address of the network access point obtained by said network access point in a phase of attachment to the communication network. This particular embodiment of the invention makes it possible to obtain the certified location information only when necessary. From the IP address of the network access point, the server of the communication network managed by the operator of the communication network checks that the network access point is indeed a network access point managed by the operator, and obtains the location of the network access point from a database of the operator.

According to another particular embodiment of the invention, the supply method comprises, beforehand, a step of sending a location request to a server of the communication network comprising an IMSI (International Mobile Subscriber Identity) identifier of the network access point, when the network access point is equipped with a SIM (Subscriber Identity Module) card. This particular embodiment of the invention is advantageous in the case where the network access point is mobile.

According to another particular embodiment of the invention, said request sent by said equipment item is a DISCOVER message according to the DHCP protocol comprising, in an OPTION field, an indication relating to a request for said location information. Said certified location information to said equipment item is sent in an OFFER response message according to the DHCP protocol in response to said request sent by said equipment item. This particular embodiment of the invention provides the advantage for transmitting the location information of using a standard implemented on most equipment items adapted to connect to a local area network. According to another particular embodiment of the invention, when the network access point is a mobile network access point, the OFFER response message sent to said equipment item comprises a predetermined lease value less than a lease value included in an OFFER response message according to the DHCP protocol sent by the network access point in response to a DHCP DISCOVER message received by the network access point and not comprising an indication relating to a location information request. This particular embodiment of the invention makes it possible to adapt the duration of the DHCP lease of the equipment item with the network access point according to whether or not the equipment item requests location information in its DHCP DISCOVER message. When the equipment item requests location information, the value of the lease is shorter, for example the lease must be renewed every ¼ hour or every ½ hour. Whereas, in the case where no location information is requested, the lease is renewed conventionally every 24 hours.

Thus, when the network access point is mobile, the equipment item has reliable location information because it is updated frequently, on each DHCP lease renewal. Correlatively, the invention relates also to a device for supplying location information adapted to implement the supply method described hereinabove according to any one of the particular embodiments of the invention.

According to a particular embodiment of the invention, such a device is included in a home gateway.

According to another particular embodiment of the invention, such a device is included in a terminal.

The invention relates also to a method for obtaining location information implemented by an equipment item that can be connected to a network access point via a local area network of said network access point. Said equipment item being able to access a communication network when it is connected to said network access point. The obtaining method comprises the following steps:

sending to said network access point a request for location information, receiving from said network access point said location information, said location information being location information certified by an operator of the communication network.

The method for obtaining location information according to the invention thus allows an equipment item, for example a connected object, to obtain reliable and accurate location information. The equipment item can then process the certified location information and supply to a user a relevant geolocated service.

Contrary to the prior art, according to the invention, the location information is directly supplied by the operator of the communication network. Thus, the user and the service provider are assured of having reliable and accurate location information, without the need for manual configuration by the user.

The different embodiments or features mentioned hereinbelow can be added independently or in combination with one another to the steps of the obtaining method defined hereinabove.

According to a particular embodiment of the invention, the request for location information is included in an "OPTION" field of a message according to the DHCP protocol sent by a DHCP client of said equipment item to a DHCP server of the network access point. This particular embodiment of the invention provides the advantage that the DHCP mechanism of the DHCP server implemented by the network access point is not impacted in the case where such a DHCP server does not support this option. Furthermore, the implementation of the invention is simplified because most of the equipment items implement the DHCP protocol.

Correlatively, the invention relates also a device for obtaining location information, adapted to implement the steps of the obtaining method defined hereinabove according to any one of the particular embodiments of the invention.

The invention relates also to a server of the communication network adapted to transmit location information to a network access point capable of establishing a local area network to which an equipment item is likely to connect to access the communication network, the location information being certified by the operator of the communication network. The server of the communication network is also able to communicate with a database BDE to obtain the certified location information.

In a particular embodiment of the invention, the different steps of the method for supplying location information and of the method for obtaining location information are implemented by computer program instructions.

Consequently, the invention also targets computer programs on an information medium, these programs being able to be implemented respectively in a terminal or more generally in a computer, these programs respectively comprising instructions suitable for implementing the different steps of the method for supplying location information or of the method for obtaining location information which have just been described.

These programs can use any programming language, and be in the form of source code, object code, or intermediate code between source code and object code, such as in a partially-compiled form, or in any other desirable form.

The invention also targets a computer-readable information medium, comprising instructions of a computer program as mentioned hereinabove.

The information medium can be any entity or device capable of storing the program. For example, the medium can comprise a storage means, such as a ROM, for example a CD ROM or a microelectronic circuit ROM, or else a magnetic or electronic storage means, for example a USB key or a hard disk.

Also, the information medium can be a transmissible medium such as an electrical or optical signal, which can be routed via an electrical or optical cable, wirelessly or by other means. The program according to the invention can in particular be downloaded over a network of Internet type.

Alternatively, the information medium can be an integrated circuit in which the program is incorporated, the circuit being adapted to execute or to be used in the execution of the methods concerned.

BRIEF DESCRIPTION OF THE DRAWINGS

Other advantages and features of the invention will become more clearly apparent on reading the following description of a particular embodiment of the invention, given as a simple illustrative and nonlimiting example, and the attached drawings, in which:

FIG. 1 presents an environment of implementation of the invention according to a particular embodiment of the invention, FIG. 2 presents steps of the method for supplying location information and steps of the method for obtaining location information according to a particular embodiment of the invention, FIG. 3 schematically illustrates a device adapted to implement the steps of the method for supplying location information according to a particular embodiment of the invention, FIG. 4 schematically illustrates a device adapted to implement the steps of the method for obtaining location information according to a particular embodiment of the invention, FIG. 5 schematically illustrates a server adapted to supply a network access point with location information according to a particular embodiment of the invention.

DESCRIPTION OF A PARTICULAR EMBODIMENT OF THE INVENTION

FIG. 1 presents an environment of implementation of the invention according to a particular embodiment of the invention. FIG. 1 comprises a communication network RES_WAN. The communication network RES_WAN is an access and collection network of a telecommunication operator, connected for example to an IMS (IP Multimedia Subsystem) subsystem of the operator. The communication network RES_WAN is for example a mobile communication mobile network such as a 2G/3G or 4G cellular communication network or a fixed communication network, such as a PSTN (Public Switched Telephone Network) network.

A network access point PAR is connected to the network RES_WAN. Such an access point is adapted to establish a local area network RES_LAN to which equipment items can connect to access the communication network RES_WAN. The network RES_LAN is for example a WIFI local area network or a wired Ethernet local area network.

The network access point PAR is for example a residential gateway of a user supplied by the operator of the communication network when the user is a subscriber to such an operator.

According to another particular embodiment of the invention, the network access point PAR is a mobile terminal operating as modem/router. In this embodiment of the invention, the mobile terminal can be connected to the network RES_WAN via a radio cell (eNobeB or base station BTS according to the technology of the access network implemented by the network RES_WAN) when the communication network RES_WAN is a mobile communication network.

According to yet another particular embodiment of the invention, the network access point is a WIFI router commonly called a Wifi HotSpot, located for example in a public place.

FIG. 1 also comprises an equipment item EQ adapted to connect to the local area network RES_LAN of the network access point PAR. Such an equipment item can be a mobile terminal, a tablet, a connected watch, a domestic unit of a home monitoring system, etc. The equipment item EQ can be any connected object adapted to communicate via a communication network. Conventionally, the equipment item EQ accesses the communication network RES_WAN via the network access point PAR.

A server SERV managed by the operator of the network RES_WAN is connected to the network RES_WAN. The server SERV is for example a server of an EPC (Evolved Packet Core) subsystem of the operator of the communication network RES_WAN when the communication network RES_WAN is a mobile network. When the communication network RES_WAN is a fixed network, the server SERV is for example a server of the IMS subsystem of the operator of the communication network RES_WAN.

The server SERV allows the network access point PAR to attach to the communication network RES_WAN and to be configured to offer access to the communication network RES_WAN to the equipment items connected to the local area network RES_LAN of the network access point PAR.

FIG. 1 also comprises a database BDE managed by the operator of the communication network RES_WAN. Such a database BDE memorizes, for each access (users, or public network access points), in particular the location of the network access point PAR. Such a location is identified accurately for example by the address, the town, the postcode. When the network access point is a residential gateway, the database BDE can also memorize the name of the subscriber, the telephone number assigned to the subscriber, etc.

According to a particular embodiment of the invention, the location of the network access point is memorized in the form of a standardized geographic code, for example an INSEE common code, or a postcode, or GPS coordinates.

When the network access point PAR is a residential gateway of a user, or a mobile terminal operating as modem/router, the database BDE is for example an HSS server of an IMS or EPC subsystem, memorizing the data relating to the users who are subscribers to the operator.

FIG. 2 presents steps of the method for supplying location information and steps of the method for obtaining location information according to a particular embodiment of the invention.

According to the particular embodiment described here, the network access point PAR obtains location information in the phase of attachment of the network access point to the communication network RES_WAN.

In a step E22, the network access point PAR attaches in a known manner to the communication network RES_WAN. To attach to the communication network RES_WAN, the network access point PAR can use the DHCP protocol defined by the RFC IETF 2132 standard, or else the PPP (Point to Point Protocol) protocol defined by the RFC IETF 1661 standard.

The embodiment described here is described in the case where the DHCP protocol is used. Other protocols are of course possible.

Following the step E22, the network access point PAR is assigned an IP address to communicate via the communication network RES_WAN. In the attachment procedure, the network access point also obtains an IP address of a DHCP server of the communication network to renew the DHCP lease. In effect, the IP address assigned to the network access point is supplied for a limited duration (lease). The network access point PAR must renew such a lease with the DHCP server which has assigned this IP address to it as soon as the value of the lease divided by two is reached.

In the step E22, the network access point sends, to the server SERV acting here as DHCP server, a DISCOVER message according to the DHCP protocol. A DISCOVER message of the prior art is illustrated by table 1.

TABLE 1

DISCOVER message

- Bootstrap Protocol (Discover)
    Message type: Boot Request (1)
    Hardware type: Ethernet (0x01)
    Hardware address length: 6
    Hops: 0
    Transaction ID: 0x0628d4e2
    Seconds elapsed: 0
- Bootp flags: 0x8000 (Broadcast)
    Client IP address: 0.0.0.0 (0.0.0.0)
    Your (client) IP address: 0.0.0.0 (0.0.0.0)
    Next server IP address: 0.0.0.0 (0.0.0.0)
    Relay agent IP address: 0.0.0.0 (0.0.0.0)
    Client MAC address: SagemCom_36:1e:53
    (00:1e:74:36:1e:53)
    Client hardware address padding: 00000000000000000000
    Server host name not given
    Boot file name not given
    Magic cookie: DHCP
- Option: (53) DHCP Message Type (Discover)
- Option: (60) Vendor class identifier
    Length: 34
    Vendor class identifier:
    FSVDSL. livebox_ToIP_SIP.Sagem.3202
- Option: (12) Host Name
- Option: (15) Domain Name
- Option: (55) Parameter Request List
- Option: (255) End Such a DISCOVER message comprises in particular an "OPTION 55 Parameter Request List" field. The "OPTION 55" field is associated with a series of parameters "Parameter Request List Item (xx)" in which "xx" indicates an identifier of the type of parameter requested in the DIS-COVER message. Such a series of parameters of the DIS-COVER message of table 1 is illustrated by table 2.

TABLE 2

OPTION (55)

Length: 34
Vendor class identifier: FSVDSL.livebox_ToIP_SIP.Sagem.3202
- Option: (12) Host Name
- Option: (15) Domain Name
- Option: (55) Parameter Request List
    Length: 22
    Parameter Request List Item: (1) Subnet Mask
    Parameter Request List Item: (28) Broadcast Address
    Parameter Request List Item: (2) Time Offset
    Parameter Request List Item: (3) Router
    Parameter Request List Item: (15) Domain Name
    Parameter Request List Item: (6) Domain Name Server
    Parameter Request List Item: (4) Time Server
    Parameter Request List Item: (7) Log Server
    Parameter Request List Item: (23) Default IP Time-to-Live
    Parameter Request List Item: (26) Interface MTU
    Parameter Request List Item: (43) Vendor-Specific Information
    Parameter Request List Item: (51) IP Address Lease Time
    Parameter Request List Item: (54) DHCP Server Identifier
    Parameter Request List Item: (55) Parameter Request List
    Parameter Request List Item: (58) Renewal Time Value
    Parameter Request List Item: (59) Rebinding Time Value
    Parameter Request List Item: (60) Vendor class identifier
    Parameter Request List Item: (61) Client identifier
    Parameter Request List Item: (72) Default WWW Server
    Parameter Request List Item: (33) Static Route
    Parameter Request List Item: (121) Classless Static Route
    Parameter Request List Item: (120) SIP Servers
- Option: (255) End According to the invention, such a DISCOVER message is enriched with a new "Request List Item" parameter for example entitled "location".

According to a variant of the particular embodiment of the invention, the new "location" parameter of the DISCOVER message is associated with a type of location. For example, the type of location is requested via a code indicating the type of information requested:

1: continent
2: country,
3: region,
4: department,
5: town,
6: street,
7: GPS coordinates,
8: radio cell identifier,
9: INSEE code,
10: postcode (ZIP code).

Other types can be envisaged. This particular embodiment of the invention makes it possible to specify the accuracy of the location requested.

During the step E22, the server SERV receives the DISCOVER message sent by the network access point PAR.

In a step E200, the server SERV interrogates the database BDE in order to obtain the information requested in the DISCOVER message and in particular the location information requested via the "location" parameter associated with the "OPTION 55" field.

For example, the server SERV interrogates the database BDE via an http request. In the step E200, the database BDE returns to the server SERV in particular the location information requested, for example in the form of an INSEE common code. In the step E200, the server SERV receives the location information from the database BDE.

In a step E23, the server SERV sends to the network access point PAR an OFFER response according to the DHCP protocol to the DISCOVER message received in the step E22. Table 3 illustrates an OFFER response of the prior art enriched with the "location" option introduced according to a particular embodiment of the invention. According to the invention, the OFFER response sent by the server SERV therefore comprises an "OPTION Location" field with which is associated the location information sent by the database BDE. The OFFER response is received by the network access point PAR in the step E23.

TABLE 3

OFFER response

- Bootstrap Protocol (offer)
    Message type: Boot Reply (2)
    Hardware type: Ethernet (0x01)
    Hardware address length: 6
    Hops: 1
    Transaction ID: 0x0628d4e2
    seconds elapsed: 2
- Bootp flags: 0x8000 (Broadcast)
    Client IP address: 0.0.0.0 (0.0.0.0)
    Your (client) IP address: 10.16.86.195 (10.16.86.195)
    Next server IP address: 172.19.106.4 (172.19.106.4)
    Relay agent IP address: 0.0.0.0 (0.0.0.0)
    Client MAC address: SagemCom_36:1e:53 (00:1e:74:36:1e:53)
    Client hardware address padding: 00000000000000000000
    Server host name not given
    Boot file name not given
    Magic cookie: DHCP
- Option: (53) DHCP Message Type (Offer)
    Length: 1
    DHCP: Offer (2)
- Option: (54) DHCP server Identifier
    Length: 4
    DHCP server Identifier: 10.167.0.25 (10.167.0.25)
- Option: (51) IP Address Lease Time
    Length: 4
    IP Address Lease Time: (86400s) 1 day
- Option: (1) Subnet Mask
    Length: 4
    Subnet Mask: 255.255.224.0 (255.255.224.0)
- Option: (3) Router
    Length: 4
    Router: 10.16.64.1 (10.16.64.1)
Option: (xx) Location
    Length: 51
    Location Type: 5
    Location: Europe/France/Paris/
- Option: (58) Renewal Time Value
    Length: 4
    Renewal Time Value: (43200s) 12 hours
- Option: (59) Rebinding Time Value
    Length: 4
    Rebinding Time Value: (75600s) 21 hours
- Option: (121) Classless Static Route
    Length: 50
    Subnet/MaskWidth-Router: 10.5.6.0/24-10.16.64.1
    Subnet/MaskWidth-Router: 10.5.7.0/24-10.16.64.1
    Subnet/MaskWidth-Router: 172.19.106.0/24-10.16.64.1
    Subnet/MaskWidth-Router: 172.19.97.0/26-10.16.64.1
    Subnet/MaskWidth-Router: 10.167.0.24/30-10.16.64.1
    Subnet/MaskWidth-Router: 10.5.201.0/24-10.16.64.1
- Option: (120) SIP Servers
    Length: 41
    SIP Server Encoding: Fully Qualified Domain Name (0)
    SIP Server Name: msr7.faz1.sbct3g.orange-multimedia.net
- Option: (255) End
    Option End: 255
    Padding According to another particular embodiment of the invention, the network access point PAR obtains the location information in the phase of configuration of the network access point PAR, that is to say after the phase of attachment to the communication network RES_WAN.

In this other particular embodiment, the step E22 is no longer a phase of attachment of the network access point PAR to the network RES_WAN, but a step of requesting configuration of the network access point PAR. In the step E22, the network access point sends to the server SERV, which then acts as a configuration API server, an http request.

An example of an http request is illustrated below by:
http: http://op.fr/WT/usrinfo/?serv=SERVLVPA&wt-cvt=4&wt-mco=MCO=OFR&info=lulo,luip,pulo,spr,loc
in which lulo, luip, pulo spr, loc are the information requested in the http request. The http request comprises an indication of the information desired by the network access point PAR to be configured and in particular the "loc" information of location of the network access point PAR. In the http request, the network access point PAR can also request information relating to the type of subscriber VoIP service offer when the network access point PAR is a residential gateway, the number of the line, the time zone associated with the VoIP line, etc.

The server SERV receives the http request in the step E22. In the step E200, the server SERV then interrogates the database BDE, from the IP address of the IP packet comprising the http request sent by the network access point PAR to determine the information requested by the network access point PAR.

In the step E23, the server SERV sends an http response comprising the requested information and in particular the location information. For example, the response is of the form:

200OK

```
<?xml version="1.0" encoding="ISO-8859-1"?>
<WTResponse xmlns:xsi="http://www.w3.org/2001/XMLSchema-instance" xsi:noNamespaceSchemaLocation="wt.xsd">
<identifiers>
<ident name="status" value="OK" />
<ident name= "pulo" value="userprincipal@op.fr" />
<ident name= "lulo" value="userprincipal@op.fr, usersecondaire1@op.fr, usersecondaire2@op.fr"/>
<ident name= "luip" value= "Primary, Multibal, Multibal" />
<ident name= "spr" value= "bitmask web/sip1 web/sip2" />
<ident name= "loc" value= "Europe/Paris" />
</identifiers>
</WTResponse>
```

According to a variant of this particular embodiment of the invention, the server SERV sends to the network access point PAR the location information in a configuration file in the phase of configuration of the network access point PAR instead of sending it in the message in response to the http request.

According to yet another particular embodiment of the invention in which the network access point PAR is a 4G mobile network access point, for example a mobile terminal operating as modem/router, the network access point PAR obtains the location information via an "Attach Request for NAS (Network Access Stratum) attachment" request with an MME (Mobility Management Entity) server (not represented) of the communication network RES_WAN. The MME server sends a "Create Session Request" request to an S-GW (Serving Gateway) server (not represented) of the communication network RES_WAN, which sends such a request to a P-GW (Packet Data Network Gateway) server (not represented) of the communication network RES_WAN. In this particular embodiment of the invention, the server P-GW then acts as a DHCP server of the communication network RES_WAN.

In this other particular embodiment of the invention, in the step E22, the network access point PAR sends to the server SERV in the NAS attachment request a new location request parameter in the PCO (Parameters Configuration) field of such a request to obtain its location. The NAS attachment request comprises in particular an IMSI identifier of the network access point PAR.

In the step E200, the server SERV interrogates the database BDE from the IMSI identifier to obtain the location of the network access point PAR. The database BDE transmits to the server such a location either directly in the form of a standardized code such as an INSEE common code, or in the form of a radio cell identifier LAI (Location Area Identifier) in 2G/3G or TAI (Tracking Area Identifier) in 4G.

When the database BDE transmits to the server SERV the location of the network access point PAR in the form of a radio cell identifier, the server SERV transforms this location into a standardized code by interrogating a database of the operator (not represented).

As a variant, the request sent by the network access point PAR also comprises an identifier of the radio cell to which the network access point PAR is attached. According to this variant, the server SERV checks, from the identifier IMSI of the request, that the network access point is indeed located on this radio cell by interrogating the database BDE and translates the radio cell identifier into a standardized geographic code.

In the step E23, the server SERV transmits to the network access point PAR its location in the form of a standardized geographic code, such as an INSEE common code, or the like. The network access point PAR memorizes, during the step E23, the location information obtained.

All the embodiments described here allow the network access point PAR to obtain location information certified by the operator of the communication network RES_WAN. In effect, such a location is supplied by a server SERV of the network RES_WAN and obtained from a database BDE managed by the operator of the network RES_WAN from an identifier (IMSI, IP address) assigned to the network access point PAR by an entity of the operator of the network RES_WAN. The location obtained is therefore reliable.

When the network access point PAR has certified location information, it can then distribute it to the equipment items connected to its local area network RES_LAN.

In a step E25, the equipment item EQ attaches to the local area network RES_LAN established by the network access point PAR. In order to provide connectivity to the network RES_LAN to the equipment item EQ, the network access point has a DHCP server adapted to supply the equipment item EQ in particular with an IP address on the network RES_LAN. Similarly, the equipment item EQ has a DHCP client adapted to communicate with a DHCP server.

In the step E25, the equipment item EQ sends to the DHCP server of the network access point PAR a DISCOVER message comprising the "location" parameter in an "OPTION 55" field according to the invention. In the step E25, the network access point PAR receives such a message which constitutes a request for location information.

In a step E26, the network access point PAR sends to the equipment item EQ the location information obtained in the step E23, in an "OPTION" field associated with the "location" parameter of an OFFER message according to the DHCP protocol according to the invention.

The DISCOVER and OFFER messages exchanged in the steps E25 and E26 are enriched with the "location" parameter as described above in relation to the steps E22 and E23.

In the step E26, the network access point also supplies in the OFFER message other information allowing the equipment item EQ to establish a connection with the local area network RES_LAN, and in particular an IP address. Following the step E26, the equipment item EQ accesses the communication network RES_WAN via the network access point PAR.

Following the step E26, the equipment item EQ can process the location information received in the step E26, for example by supplying this information to an application providing a geolocated service or by memorizing this information in a memory accessible for an application layer of a VoWIFI service, etc.

Depending on the form in which the location information is stored by the database BDE, a transformation step (not represented) may be necessary to translate the location information into a standardized geographic code that can be understood by the service implemented by the equipment item EQ. Such a translation can be implemented by the server SERV before the sending of the location information to the network access point PAR, by the network access point PAR or else by the equipment item EQ when the equipment item EQ has received this location information from the network access point PAR. For example, when the location information is in the form of GPS coordinates or of a radio cell identifier, it can be translated into an INSEE code, or a postcode (or ZIP code). Such a translation can be done from a database of the operator storing, for example, a mapping between the radio cell identifiers and the INSEE common codes or else storing mappings between the INSEE codes or postcodes and their location by GPS coordinates.

According to a particular embodiment of the invention, when the network access point PAR is a mobile network access point, for example a mobile terminal, the OFFER response message sent to the equipment item EQ in the step E26 comprises a predetermined lease renewal value, for example ½ hours. Such a lease renewal value is less than the conventional lease renewal value which is included in an OFFER response message sent in response to a DISCOVER message not including an indication relating to a location information request. For example, when the equipment item EQ does not request location information, the lease value is 24 hours. In this case, the equipment item EQ renews its lease with the network access point PAR to keep its IP address every 12 hours (value of the lease divided by 2). Now, when the network access point PAR is mobile, the location of the network access point PAR may have changed during the 12 hours after the initial attachment of the equipment item EQ. For example, the mobile network access point PAR may change 2G/3G or 4G cell. The location supplied initially to the equipment item EQ upon its attachment to the network RES_WAN is therefore not necessarily valid throughout the duration of attachment of the equipment item.

The particular embodiment described here therefore makes it possible to adapt the lease renewal value with the network access point PAR according to whether location information is requested or not by the equipment item EQ.

According to this particular embodiment of the invention, the DHCP server of the network access point PAR assigns a shorter lease value to the equipment item EQ if it requests location information in its DISCOVER initial attachment request. For example, the lease duration supplied is set at 30 minutes. The equipment item EQ then renews its lease every ¼ hour.

As a variant, the equipment item EQ can request different levels of precision of location options with which different lease values are associated.

For example:
Option xx1: location→no constraint
Option xx2: location-TTL-24H→location life precision 24H
Option xx3: location-TTL-12H→location life precision 12H
Option xx4: location-TTL-1H→location life precision 1H The lease value sent by the network access point PAR is thus adapted as a function of the precision of the life of the location. In return, the DHCP server sets a lease value as a function of the option requested. For example, for the Option xx4, the life of the location is 1 hour, the DHCP server therefore sets the lease at 1 hour and the renewal of the lease must be done every ½ hour. According to another example, for the option Option xx3, the life of the location is 12 hours, the DHCP server sets the lease at 12 hours and the latter will be renewed every 6 hours. This variant embodiment makes it possible to define a lease duration as a function of the use of the location information made by the equipment item EQ. For example, for a geolocated service supplied by a connected weather station, a life of 12 hours is sufficient. According to another example, for a voice over WIFI (VoWIFI) service supplied by a tablet or a smartphone, a life of 1 hour is necessary in order to have a location that is always up to date in case of emergency calls to be made.

FIG. 3 schematically illustrates a device PAR adapted to implement the steps of the method for supplying location information according to a particular embodiment of the invention.

The device PAR has the conventional architecture of a computer. The device PAR comprises a storage module MEM, for example a memory, a processing module PROC, equipped for example with a microprocessor, and driven by a computer program PG.

On initialization, the code instructions of the computer program PG are for example loaded into memory MEM before being executed by the processor of the processing module PROC.

According to the instructions of the computer program PG, the processor of the processing module PROC implements the steps of the method for supplying location information to an equipment item connected to a local area network RES_LAN of said device PAR, said device PAR being adapted to give said equipment item access to a communication network RES_WAN to which said device PAR is connected. The processor of the processing module PROC implements in particular the steps of obtaining, from a server of the communication network RES_WAN, information on the location of said device PAR, said location information being location information certified by the operator of the communication network, of reception from said equipment item of a request for location information, and of sending to said equipment item said certified location information obtained.

The storage module MEM in particular allows the device PAR to store said certified location information.

The device PAR also comprises a communication module COM adapted to communicate with other equipment items via, in particular, the communication network RES_WAN and the local communication network RES_LAN described in relation to FIG. 1. The communication module COM cooperates with the processing module PROC to allow in particular the device PAR to obtain location information, to receive a request for location information from an equipment item, and to send the location information to said equipment item.

The device PAR is for example a network access point such as a residential or professional gateway or a WIFI router.

According to another particular embodiment, the device PAR is a terminal, for example a mobile terminal, operating as modem/router.

FIG. 4 schematically illustrates a device EQ adapted to implement the steps of the method for obtaining location information according to a particular embodiment of the invention.

The device EQ comprises a storage module MEM4, for example a memory, a processing module PROC4, equipped for example with a microprocessor, and driven by a computer program PG4.

On initialization, the code instructions of the computer program PG4 are for example loaded into memory MEM4 before being executed by the processor of the processing module PROC4.

According to the instructions of the computer program PG4, the processor of the processing module PROC4 implements the steps of the method for obtaining location information as described in relation to FIG. 2. When said equipment item EQ is connected to a network access point PAR via a local area network RES_LAN of said network access point PAR, said equipment item EQ is able to access a communication network RES_WAN via said network access point PAR. According to the instructions of the computer program PG4, the processor of the processing module PROC4 implements in particular the steps of sending to said network access point PAR a request for location information, of receiving from said network access point PAR said location information, said location information being location information certified by an operator of the communication network RES_WAN.

The storage module MEM4 in particular allows the device EQ to store said received location information so as to supply it to an application providing a geolocated service.

The device EQ also comprises a communication module COM4 adapted to communicate with other equipment items via in particular the communication network RES_WAN and the local communication network RES_LAN described in relation to FIG. 1. The communication module COM4 cooperates with the processing module PROC4 to allow in particular the device EQ to send to said network access point PAR a request for location information, and to receive from said network access point PAR said location information.

The device EQ is for example a fixed or mobile terminal, a smartphone, a tablet, a connected television, a personal computer, a connected watch, or any other connected object capable of communicating via a communication network and of providing a geolocated service.

FIG. 5 schematically illustrates a server SERV adapted to supply to a network access point PAR location information according to a particular embodiment of the invention.

The server SERV has the conventional architecture of a computer. The server SERV comprises a storage module MEM5, for example a memory, a processing module PROC5, equipped for example with a microprocessor, and driven by a computer program PG5.

On initialization, the code instructions of the computer program PG5 are for example loaded into memory MEM5 before being executed by the processor of the processing module PROC5.

According to the instructions of the computer program PG5, the processor of the processing module PROC5 implements the steps of the method for supplying location information described in relation to FIG. 2. The processor of the processing module PROC5 implements in particular the steps of receiving from the network access point PAR a request for location information (step E22), of interrogating the database BDE to obtain information on the location of the network access point PAR and of receiving such information from the database (step E200), of transmitting to said network access point PAR said location information certified by the operator of the communication network RES_WAN (step E23).

The storage module MEM5 in particular allows the server SERV to store said certified location information.

The server SERV also comprises a communication module COM5 adapted to communicate with other equipment items via in particular the communication network RES_WAN described in relation to FIG. 1. The communication module COM5 cooperates with the processing module PROC5 to allow in particular the server SERV to communicate with the database BDE and the network access point PAR.

According to a particular embodiment of the invention, the server SERV comprises a DHCP server adapted to supply the certified location information to the network access point PAR in a DHCP OFFER message as described in table 3 above.

Although the present disclosure has been described with reference to one or more examples, workers skilled in the art will recognize that changes may be made in form and detail without departing from the scope of the disclosure and/or the appended claims.

The invention claimed is:

1. A method for supplying location information to an equipment item, said method being implemented by a network access point adapted to give said equipment item access to an access network to which the access point is connected when said equipment item is connected to a local communication network of said network access point, said method comprising:
   obtaining, from a server of the access network, information on a geographic location of said network access point, said geographic location information being certified by an operator of the access network, the geographic location information being obtained from an OFFER message according to a DHCP protocol sent in response to a DISCOVER message sent by said network access point to a DHCP server of the access network,
   receiving, from said equipment item, via the local communication network, a request for location information,
   sending, to said equipment item, via the local communication network, said certified geographic location information obtained,
   wherein the geographical location information of the network access point is obtained by the network access point from the server of the access network before receiving the request for location from the equipment item.

2. The method as claimed in claim 1, in which the geographic location information is a standardized geographic code.

3. The method as claimed in claim 1, in which the obtaining of said geographic location information is implemented in a phase of attachment of said network access point to the access network.

4. The method as claimed in claim 1, in which the obtaining of said geographic location information is implemented in a phase of configuration of said network access point, after the attachment of the network access point to the access network.

5. The method as claimed in claim 4, in which the certified geographic location information is obtained from a response to a request sent by the network access point according to the http protocol.

6. The method as claimed in claim 1, comprising, beforehand, an act of sending a location request to a server of the access network comprising an IMSI identifier of the network access point, when the network access point is equipped with a SIM card.

7. The method as claimed in claim 1, in which:
   said request sent by said equipment item is a DISCOVER message according to the DHCP protocol comprising, in an OPTION field, an indication relating to a request for said location information,
   said certified geographic location information to said equipment item is sent in an OFFER response message according to the DHCP protocol in response to said request sent by said equipment item.

8. The method as claimed in claim 7, in which, when the network access point is a mobile network access point, the OFFER response message sent to said equipment item comprises a predetermined lease value less a than lease value included in an OFFER response message according to the DHCP protocol sent in response to a DHCP DISCOVER message not comprising an indication relating to a location information request.

9. A network access point for supplying location information to an equipment item that can be connected to a local communication network of said network access point, said network access point being adapted to give said equipment item access to an access network to which said network access point is connected when said equipment item is connected to said local communication network, the network access point comprising:
   a processor; and
   a non-transitory computer-readable medium comprising instructions stored thereon,
   which when executed by the processor configure the network access point to perform acts comprising:
      obtaining, from a server of the access network, information on the geographic location of said device, said geographic location information being geographic location information certified by an operator of the access network, the geographic location information being obtained from an OFFER message according to a DHCP protocol sent in response to a DISCOVER message sent by said network access point to a DHCP server of the access network,
      storing said certified geographic location information in a memory,
      receiving, from said equipment item, via the local communication network, a request for location information, and
      sending to said equipment item, via the local communication network, said certified geographic location information,
      wherein the geographical location information of the network access point is obtained and stored by the network access point from the server of the access network before receiving the request for location from the equipment item.

10. A terminal comprising the network access point as claimed in claim 9.

11. A method for obtaining location information, said method being implemented by an equipment item that can be connected to a local communication network of a network access point, said equipment item being configured to access an access network via said network access point when said equipment item is connected to said local communication network, wherein said method comprises:
    sending, via the local communication network, to said network access point a request for location information, wherein said request sent by said equipment item is a DISCOVER message according to a DHCP protocol comprising, in an OPTION field, an indication relating to the request for said location information, and
    receiving, via the local communication network, from said network access point said location information, said location information being geographic location information of said network access point certified by an operator of the access network, wherein said certified geographic location information received by said equipment item is received in an OFFER response message according to the DHCP protocol in response to said request sent by said equipment item.

12. A device for obtaining location information, that can be connected to a local communication network of a network access point, said device being configured to access an access network via said network access point when said device is connected to said local communication network, the device comprising:
    a processor; and
    a non-transitory computer-readable medium comprising instructions stored thereon, which when executed by the processor configure the device to perform acts comprising:
        sending, via the local communication network, to said network access point a request for location information, wherein said request sent by said device is a DISCOVER message according to a DHCP protocol comprising, in an OPTION field, an indication relating to the request for said location information, and
        receiving from said network access point, via the local communication network, said location information, said location information being geographic location information of the network access point certified by an operator of the access network, wherein said certified geographic location information received by said device is received in an OFFER response message according to the DHCP protocol in response to said request sent by said device.

* * * * *